March 16, 1965  H. L. CUNNINGHAM  3,173,337
HYDRAULIC VARIABLE SPEED FEED MECHANISM FOR
MACHINE TOOLS AND THE LIKE
Filed Sept. 14, 1962  3 Sheets-Sheet 1
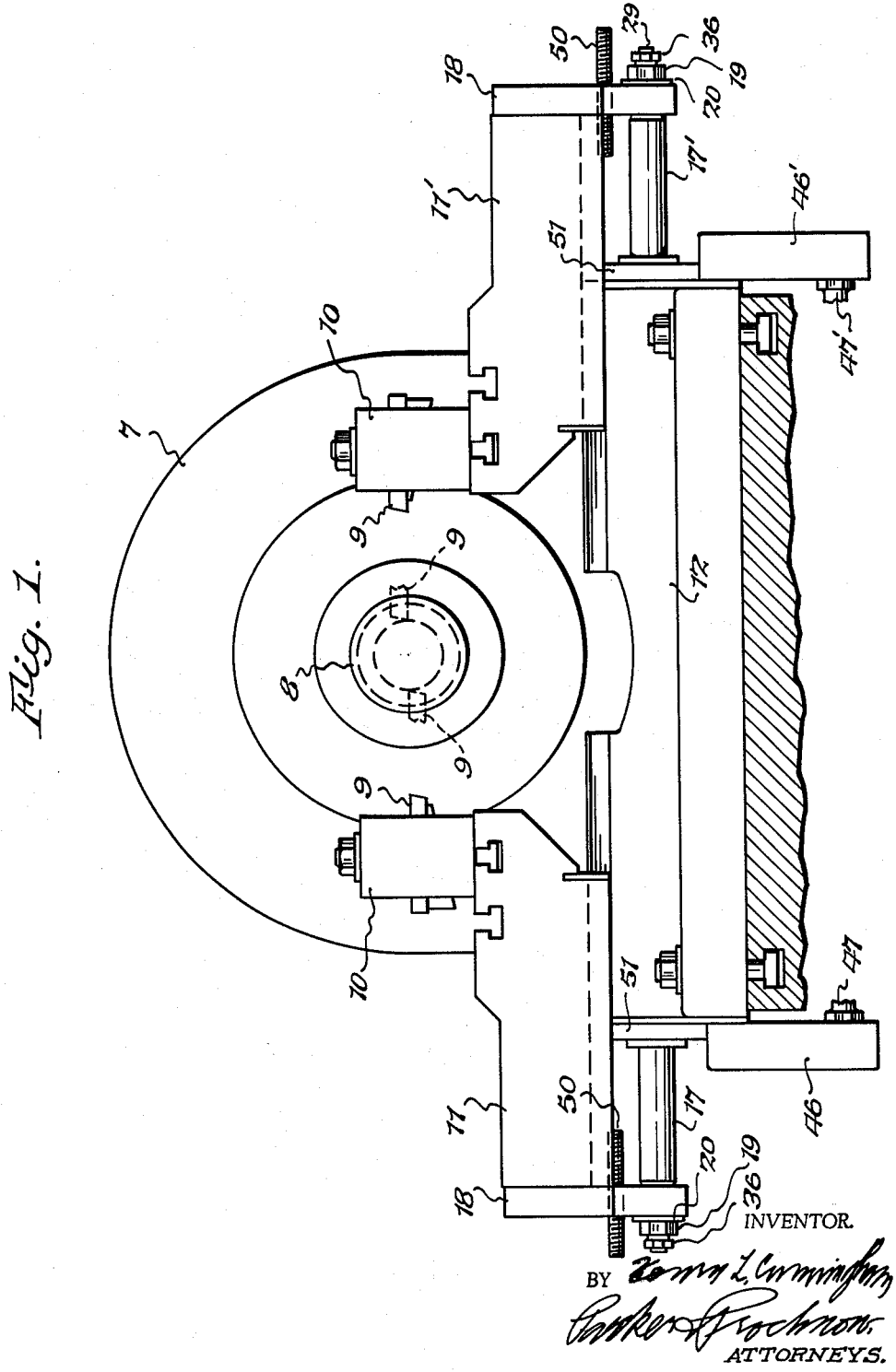

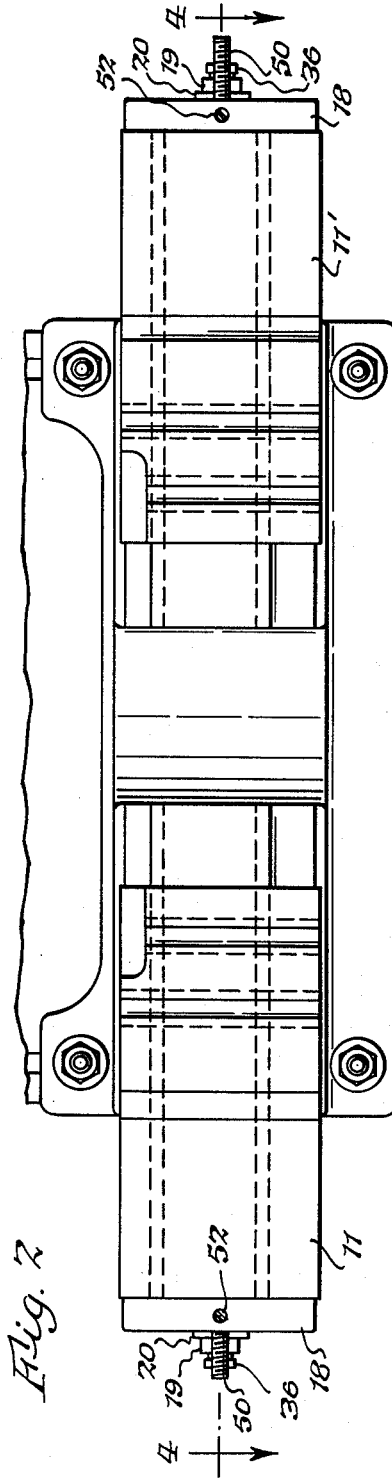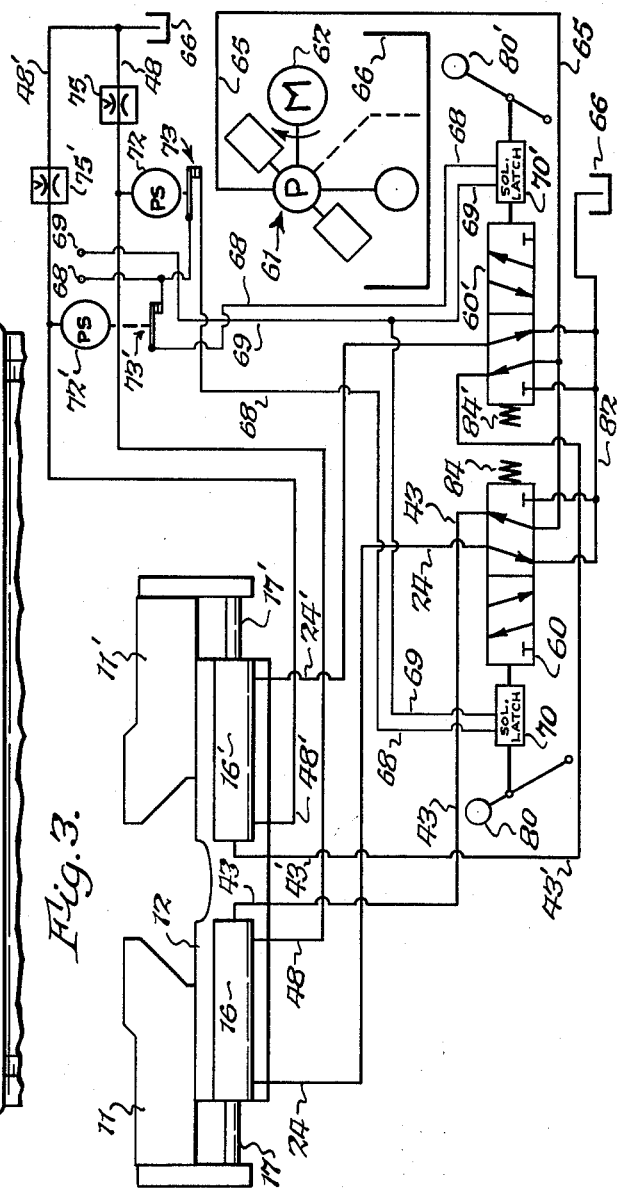

United States Patent Office 3,173,337
Patented Mar. 16, 1965

3,173,337
HYDRAULIC VARIABLE SPEED FEED MECHANISM FOR MACHINE TOOLS AND THE LIKE
Henry L. Cunningham, Horseheads, N.Y., assignor to Hardinge Brothers, Inc., Elmira, New York
Filed Sept. 14, 1962, Ser. No. 223,726
8 Claims. (Cl. 91—356)

This invention relates to hydraulic feed mechanisms of the type having a member connected with a machine part for moving the same at various speeds, for example at a rapid or traverse speed to place a cutting tool into operative relation to the work, and at a slower speed to move the cutting tool into the work.

One of the objects of this invention is to provide a hydraulic mechanism of improved construction for slowing down the movement of a machine part. Also to provide a mechanism of this type which is located mainly in the hydraulic cylinder of the mechanism.

Another object is to provide change speed mechanism of this type in which the change of speed of the piston in the hydraulic cylinder is effected mainly by changes in pressure of fluid in the cylinder.

A further object is to provide a hydraulic mechanism in which the piston has means for varying the rate of discharge of fluid from the cylinder at the side of the piston opposite to that at which pressure fluid enters the cylinder, the varying rates of discharge resulting in varying speeds of travel of the piston.

In the accompanying drawings I have illustrated my invention as applied to a lathe but it will be understood that my invention may be equally well applied to other types of machines.

In the accompanying drawings:

FIG. 1 is a transverse, sectional view of a lathe showing the headstock in elevation.

FIG. 2 is a top plan view of the cross slides which may be actuated by my improved hydraulic mechanism.

FIG. 3 is a diagrammatic view showing hydraulic and electrical connections for actuating my improved mechanism.

Figure 4:
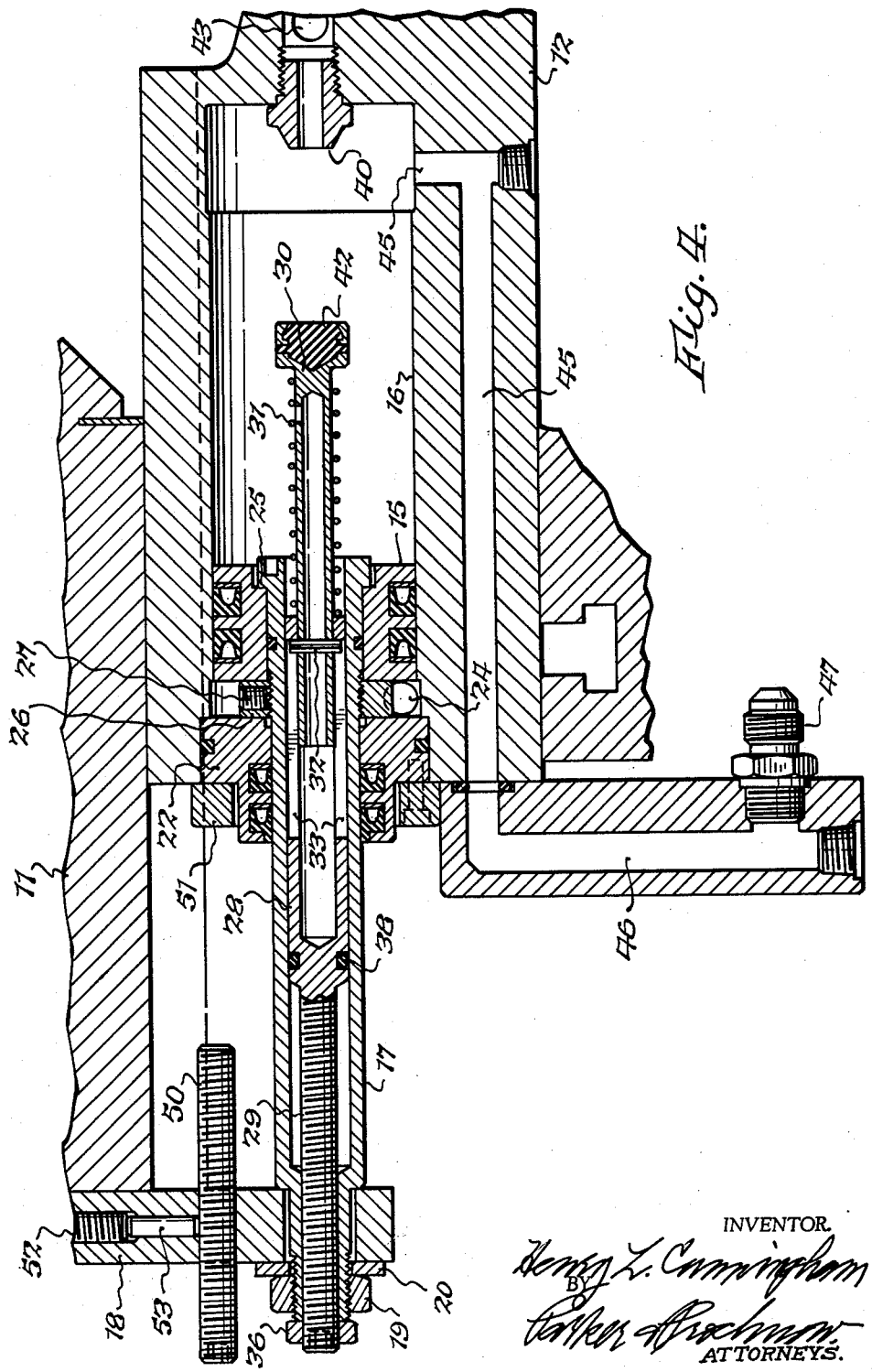
FIG. 4 is a sectional elevation therof on line 4—4 FIG. 2.

The lathe to which my invention is applied by way of illustration has a headstock 7 provided with the usual work holder, having a workpiece 8 held in place thereon. The drawings illustrate a lathe having two cutting tools 9 mounted on tool holders 10 arranged at opposite sides of the work piece and each mounted on a slide 11 which is dovetailed and gibbed to a base 12 so that either tool may be moved crosswise of the machine into cutting relation to the workpiece 8. While I have illustrated two slides 11 carrying tools, it will be obvious that my invention may equally well be applied to a machine having only a single tool, and since both slides are actuated by similar mechanism, the mechanism for moving a single slide only will be herein described.

The movement of the slide is effected by means of a piston 15 arranged in a cylinder 16 which may be mounted on or formed as a part of the bed. The cylinder in the construction shown is formed in the base 12 and the piston 15 is provided with a piston rod 17 extending out of the head of the cylinder 16, and the outer end of this piston rod is rigidly secured to an end cap 18 rigidly secured to and extending downwardly from the slide 11. The piston rod may be secured to the cap 18 in any suitable manner, and in the construction shown the cap has a hole in the lower portion thereof through which a reduced end of the piston rod extends. A nut 19 and washer 20 secure the piston rod to the cap 18 so that the cap and the slide 11 will be moved in accordance with movements of the piston 15.

The cylinder 16 has the usual cylinder head 22 suitably secured to the cylinder, and motive fluid may be admitted to the head end of the cylinder in any suitable manner, for example, through an opening 24, FIG. 4. The piston may be connected to the piston rod in any suitable manner, for example, by an enlarged flange of the piston rod forming a stop shoulder 25 engaging one side of the piston, and the nut 26 engaging a threaded part of the piston rod on the opposite side of the piston and secured in position by means of the lock screw 27.

The piston rod 17 has an axial bore in a part thereof terminating at its rear end, and an adjusting sleeve 28 is slidably arranged in this bore and has a screw threaded end 29 at the opposite end thereof extending out through the front end of the piston rod. A plunger 30 is slidably arranged in the bore of the adjusting sleeve 28 and is urged rearwardly out of the adjusting sleeve by means of a coil spring 31 bearing at one end on a head at the outer end of the plunger and at its other end on the inner end of the adjusting sleeve 28. The plunger is also provided with a stop pin 32 extending crosswise of the plunger and having its ends movable in slots 33 in the wall of the adjusting sleeve for limiting its movement.

The threaded end 29 of the adjusting sleeve extends out through a threaded hole in the end of the hollow piston rod 17. By means of this screw threaded part 29 of the adjusting sleeve 28, the plunger 30 may be located at different distances from the rear end of the piston 15, and when adjusted may be held in the desired position by means of a lock nut 36. A suitable gasket or rubber sealing ring 38 is provided about the adjusting sleeve 28 to prevent the escape of motive fluid through the space between the adjusting sleeve and the bore of the piston rod 17.

When motive fluid under pressure is admitted to the head end of the cylinder 16, it is of course necessary to discharge fluid contained in the opposite or rear end of the cylinder, and for this purpose a discharge passage is provided which includes a valve seat 40 and a conduit 43 leading therefrom to a sump. The valve seat 40 and conduit 43 are of relatively large diameter, so that the piston 15 and the slide 11 will move rapidly or at a traverse speed toward the rear end of the cylinder.

The plunger 30 is constructed to stop the rapid flow of fluid from the rear of the cylinder after a predetermined movement of the piston and, in the construction shown for the purpose, the plunger is provided at its rear end with a stopper 42 formed to cooperate with the valve seat 40 so as to stop further discharge of fluid from the cylinder through the valve seat to the sump. By varying the relation between the plunger 30 and the piston rod 17 by means of the adjusting screw 29, the length of travel of the piston during the traverse movement may be varied by rotating the adjusting sleeve 28 and then tightening the lock nut 36. By thus varying the initial distance between the stopper 42 and valve seat 40, the distance through which the piston and the slide 11 move at traverse speed may be varied as desired. By having the piston rod 17 and the adjusting screw extend into readily accessible positions exterior to the cylinder, this adjustment can readily be made without disassembling any part of the feed mechanism.

When the rapid flow of fluid from the rear end of the cylinder 16 is stopped by engagement of the stopper 42 with the valve seat, further displacement of the liquid by rearward movement of the piston results in a flow of liquid through a passage 45 formed in the base 12, and through an extension 46 thereof through a coupling 47 to a needle valve of any usual or suitable construction. This needle valve is preferably adjustable so that the slow speed of the piston and top slide 11 may be controlled as desired. The piston and top slide 11 may then move to the right in FIG. 4 at reduced speed until an adjustable stop screw 50 seated in a threaded hole in the cap 18 engages fixed part of the mechanism such as a ring 51 suitably secured to the cylinder head 22. This stop screw is also adjustable to accurately set the distance through which the top slide 11 moves at reduced speed. This stop screw 50 may be located in set position by means of a clamping screw 52 acting through a rod 53 of softer metal.

When the piston 15 has been moved to the right in FIG. 4 to the extent permitted by the stop screw 50, the pressure within the rear part of the cylinder into which the piston has been moving drops rapidly, since no pressure is applied thereto by the piston. Through suitable mechanism hereinafter explained, the pump which supplied the motive fluid to the inlet port 24 will then discharge fluid through the valve seat 40 and thus return the piston to its original position as shown in FIG. 4. This is made possible by the fact that the maximum movement of the stopper 42 to close the valve seat 40 is less than the length of the slots 33 in which the stop pin 32 moves. Consequently the plunger will have no force exerted on it at this time and when fluid is entered through the valve seat 40, the plunger can readily be moved backwardly through the slight difference in length between its movement to the valve seat and the length of the slots 33. The stopper will consequently be quickly removed from the valve seat, thus permitting fluid to enter the back part of the cylinder to push the piston back to its starting position. Pressure will now build up behind the piston 15 even though some leakage will occur through the return line 48 through the needle valve controlling the rate of fluid during the cutting stroke, since the volume of leakage through this needle valve is relatively small.

As shown diagrammatically in FIG. 3, the slide 11, cylinder 16 and piston rod 17 are mounted on the base 12 opposite another slide 11', cylinder 16' and piston rod 17'. The slide and cylinder 16 are under the control of a manually operated valve 60 while the slide and cylinder 16' are under the control of another manually operated valve 60'. Since both cylinders 16 and 16' have identical hydraulic piping and component arrangements, this explanation will suffice for both with the numerals for the cylinder 16' all having prime (') suffixes.

A pump 61 driven by a motor 62 provides hydraulic fluid under pressure to both valves 60, 60' through a feed line 65, the pump 61 being provided with the usual sump 66. Electric current of the proper voltage is supplied to the electric lines 68 and 69 to operate a solenoid latch 70 under the control of a pressure responsive switch 72 having a pair of contacts 73. This pressure switch 72 is connected to the line 48 of the cylinder 16 ahead of an adjustable needle valve 75, this line 48 then discharging into the sump 66.

The position of the parts in FIG. 3 is in a retracted position, the same as that in FIG. 4.

*Operation*

Each control valve 60 is in this example provided with a control handle 80 which when pushed into a position toward its valve 60 will set the slide 11 into operation to move toward the workpiece in the machine, it will latch into this ON position and when the cut has been completed to the depth set by the stop screw 50, it will automatically return to OFF position and the slide will retract to its front position.

Assuming a cut is to be taken, the operator will move the valve control toward the valve to the ON position, which will cause the following to take place. The pump motor 62 which has been turned on will cause the pump 61 to provide fluid pressure in the line 65 to the valve 60. Since the valve spool has been placed in the other position to that shown in FIG. 3, fluid pressure will enter the line 24 in front of the piston 15, FIG. 4, and drive it toward the valve seat 40 at high or traverse speed, carrying the slide 11 and cutting tool 9 with it toward the workpiece 8. Fluid in rear of the piston 15 flows out through the valve seat 40 to the line 43 to the valve 60 and is connected through the valve spool of valve 60 to the sump line 82 to sump 66. These connections are of large size so as not to slow down the slide in its traverse movement.

The stopper 42 upon contacting the valve seat 40 abruptly cuts off this free exit of fluid and causes pressure to build up in the rear end of cylinder 16 slowing it down to a proper feed speed for cutting of the workpiece. The feed rate will now be governed by the setting of the needle valve 75 in the line 48 to the sump, which is now the only exit for fluid from the cylinder 16. When the slide stop 50 engages the collar 51 movement stops and hydraulic pressure in the cylinder and its line 48 drops, whereupon the pressure switch 72 acts upon its contacts 73 to open them, thus deenergizing the solenoid of the latch 70 which releases the valve spool stem to permit the spring 84 of the valve 60 to return it to OFF or retract position. The valve will now be returned to that position shown in FIG. 3. Fluid pressure will now flow from the pump 61, line 65, through valve 60 to line 43 to the valve seat 40, whereupon it moves the stopper 42 away from the seat 40 against spring pressure and flows into cylinder 16 to return it to retract position. The line 24 now connected to sump line 82 allows the return of the fluid in front of the piston 15 to the sump 66. It will stay in this position until reactivated by the control handle 80.

The operator can at will operate each of the slides individually or simultaneously by the procedure just explained.

It will be understood that various changes in the details, materials and arrangements of parts which have been herein described and illustrated in order to explain the nature of the invention may be made by those skilled in the art within the principle and scope of the invention as expressed in the appended claims.

I claim:

1. A hydraulic mechanism for moving a machine part at different speeds and including:
   a cylinder,
   a piston reciprocable in said cylinder and connected with said machine part,
   means for admitting motive fluid to one side of said piston for advancing same,
   means for discharging motive fluid from the other side of said cylinder at a rapid rate,
   a part mounted on said piston and movable into a position to stop the discharge of fluid at a rapid rate from said other side of said cylinder,
   other fluid discharge means on said other side of said cylinder for discharge of fluid from said cylinder at a slow rate to retard the rate of movement of said piston when rapid discharge has been stopped,
   and extensions on said piston and said part which extend to the exterior of said cylinder and adjustable relatively to each other to vary the position at which said part stops said fluid discharge at rapid rate,
   positive means for stopping movement of said piston to stop all discharge of fluid from said cylinder,
   and means actuated by the stoppage of discharge of fluid from said cylinder to admit fluid under pressure to said other side of said cylinder to return said piston to its initial position.

2. A mechanism according to claim 1 in which the rapid discharge of fluid from said cylinder includes a conduit, and a stopper mounted on said piston which closes said conduit for interrupting the rapid discharge of fluid from said cylinder.

3. Mechanism according to claim 1 and including means actuated by reduced pressure in said other side of cylinder which admits fluid under pressure to said other side of said cylinder and returns said piston to its initial position.

4. A hydraulic feed mechanism for moving a machine part at different speeds, including
a cylinder,
a piston in said cylinder,
means for supplying motive fluid to one side of said cylinder,
a pair of discharge passages for fluid at the other side of said cylinder, one of said passages being of greater capacity than the other to permit rapid movement of said piston and the other passage being of less capacity to retard the movement of said piston when said first mentioned passage is stopped,
a stop means carried by said piston to interrupt flow through said first mentioned passage, whereby the rate of travel of said piston is reduced due to slow discharge of fluid through said other passage and means operable from the exterior of said mechanism for limiting the extent of travel of said piston toward the first discharge passage.

5. A mechanism according to claim 4 and including a threaded connection between said piston and said stop means for adjusting the position of said stop means relatively to said piston to stop the discharge of fluid at a rapid rate from said other side of said cylinder, at variable points throughout its total travel.

6. A mechanism according to claim 4 and including means actuated by the reduction of pressure in said cylinder when said piston stops movement for reversing the flow of fluid through said first mentioned passage for returning said piston to its starting position at traverse speed.

7. A hydraulic feed mechanism for machine tools comprising:
a base,
a reciprocatory slide member mounted on said base,
a stationary cylinder on said base,
a piston reciprocable in said cylinder and having
a hollow piston rod connected to said slide member,
an adjusting sleeve in said hollow piston rod and normally movable with said piston rod,
a plunger reciprocable in said adjusting sleeve and extending into the rear of said cylinder in advance of said piston,
fluid discharge means for discharging fluid displaced by said piston, rapidly from said cylinder,
means actuated by said plunger for interrupting said discharge of fluid through said discharge means,
and other valve controlled discharge means for discharging fluid slowly from said piston,
when said first discharge means is interrupted,
said plunger being movable into said adjusting sleeve after interrupting rapid flow of fluid from said piston, a portion of said piston extending out of said cylinder and adjustable on the exterior of said cylinder with said adjusting sleeve lengthwise thereof to stop the discharge of fluid at a rapid rate from said other side of said cylinder at variable points throughout its total travel.

8. A feed mechanism according to claim 7 including positive means for stopping further movement of said slide member and said piston independent of said plunger.

References Cited in the file of this patent
UNITED STATES PATENTS

| | | |
|---|---|---|
| 1,812,533 | Hunt | June 30, 1931 |
| 2,467,305 | Griffin | Apr. 12, 1949 |
| 2,578,810 | Kilar et al. | Dec. 18, 1951 |
| 2,715,389 | Johnson | Aug. 16, 1955 |
| 2,716,395 | Pettigrew et al. | Aug. 30, 1955 |
| 2,815,004 | Droman | Dec. 3, 1957 |
| 3,071,116 | Smallpiece | Jan. 1, 1963 |

FOREIGN PATENTS

| | | |
|---|---|---|
| 451,779 | Canada | Oct. 12, 1948 |